United States Patent [19]

Makinen

[11] 3,904,241

[45] Sept. 9, 1975

[54] VEHICLE HEADREST

[75] Inventor: John P. Makinen, Royal Oak, Mich.

[73] Assignee: General Motors Corporation, Detroit, Mich.

[22] Filed: Nov. 21, 1974

[21] Appl. No.: 525,861

[52] U.S. Cl. ............................. 297/391; 297/410
[51] Int. Cl.² ........................................ A47C 7/36
[58] Field of Search ............ 297/391, 410, 404, 61

[56] References Cited
UNITED STATES PATENTS

| | | | |
|---|---|---|---|
| 3,027,194 | 3/1962 | Rumptz | 297/410 |
| 3,498,672 | 3/1970 | Leichtl | 297/410 |
| 3,512,832 | 5/1970 | Kage | 297/410 |
| 3,563,603 | 2/1971 | D'Aprile | 297/410 |

Primary Examiner—Roy D. Frazier
Assistant Examiner—Darrell Marquette
Attorney, Agent, or Firm—C. E. Leahy

[57] ABSTRACT

An improved latch arrangement for attaching the support bar of a headrest and an escutcheon to a vehicle seat back. A mounting bracket located on the seat back frame has vertically spaced apertures which slidably receive the support bar. An escutcheon conceals the opening in the top of the seat back and has a central aperture through which the support bar is inserted. A leaf spring is mounted on the mounting bracket and has first and second latch members mounted thereon. The first latch member and the escutcheon have coacting cam surfaces which deflect the spring to carry the first latch member out of the path of entry of the escutcheon. The escutcheon has an aperture into which the leaf spring biases the first latch member to attach the escutcheon to the seat back. The second latch member and the support bar have coacting cam surfaces which deflect the leaf spring and its second latch member to permit entry of the support bar. The support bar has an aperture into which the leaf spring biases the second latch member to attach the support bar to the seat back. A special tool is provided to facilitate removal of the support bar and escutcheon.

3 Claims, 5 Drawing Figures

PATENTED SEP 9 1975　　　　　　　　　　　　　　　3,904,241

3,904,241

VEHICLE HEADREST

The invention relates to a headrest for a motor vehicle seat and more particularly to an improved latch for attaching the headrest and an escutcheon to the vehicle seat.

It is desirable in more vehicles to provide a headrest on the seat. Such headrests commonly include a headrest cushion having a bar which extends downwardly from the cushion into the seat back where it is engaged in a mounting bracket. An apertured escutcheon is provided to surround the support bar and conceal the opening in the seat back trim which receives the support bar.

In the prior patents, a first attachment device is utilized to mount the support bar of the seat back and a separate second attachment device is utilized to mount the escutcheon on the seat back.

The present invention provides an improved and simplified attachment device for mounting both the headrest support bar and the escutcheon on the seat back.

According to the invention the headrest includes a cushion having a support bar which is inserted through an opening on the top of the seat back. A mounting bracket is attached to the seat back frame and has vertically spaced apertures which slidably receive the support bar. An escutcheon for trimming the opening in the top of the seat back has a central aperture through which the support bar of the headrest is inserted. A leaf spring is attached to the mounting bracket and carries a first latch member having a ramped cam surface which coacts with a ramped cam surface on the end of the escutcheon to flex the leaf spring and first latch member out of the path of entry of the escutcheon. The leaf spring then carries the first latch member into latching engagement of a slot in the escutcheon to attach the escutcheon to the seat back. A second latch member is also mounted on the leaf spring and has a ramped cam surface which coacts with a ramped cam surface on the end of the support bar to flex the second latch member out of the path of entry of the support bar. The leaf spring then urges the second latch member into latching engagement of an aperture in the support bar to attach the headrest to the seat back. The first and second latch members, their respective ramped cam surfaces, the support bar and the escutcheon are dimensionally interelated so that the first latch member which latches the escutcheon is not moved to its full unlatched position during entry of the support bar and the attendant coaction between the ramped cam surfaces of the second latch member and the support bar. A forked-shaped tool is provided which can be inserted in the space between the escutcheon and the support bar to engage the ramped cam surface of the first latch to deflect the leaf spring and disengage the first and second latch members so that the headrest and escutcheon may be removed.

One feature of the present invention is the provision of an improved latch arrangement for a headrest including a single spring carrying first and second latch members to respectively latch the escutcheon and the support bar.

Another feature of the invention is the provision of a headrest which can be removed only with a special tool.

These and other objects, features and advantages of the invention will become apparent upon consideration of the specification and the appended drawings in which.

Figure 1:
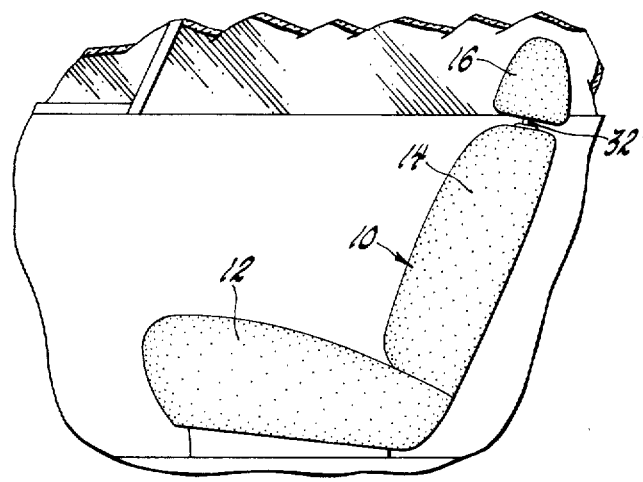
FIG. 1 is a side elevation view of a vehicle seat.

Referring to FIG. 1 a vehicle seat indicated generally at 10 includes a seat bottom 12, a seat back 14, and a headrest 16.

Figure 2:
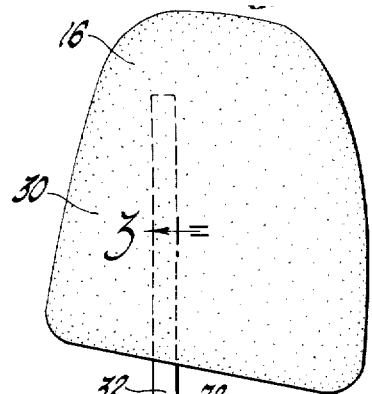
FIG. 2 is an enlarged partial view of FIG. 1 having parts broken away in section.
Figure 5:
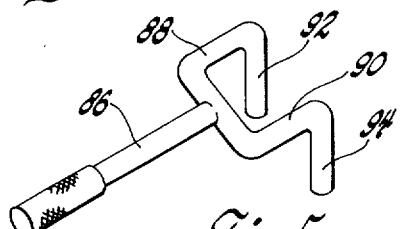
FIG. 5 is a perspective view of a tool for removing the headrest and escutcheon.

Referring to FIG. 2 it will be seen that the seat back 14 includes a frame member 18 which supports a resilient cushion 20. A mounting bracket 22 is attached to the frame member 18 as by welding and has vertically spaced apertures 24 and 26. The headrest 16 includes a resilient foam cushion 30 which has a support bar 32 extending downwardly therefrom. The support bar 32 is adapted for sliding engagement in the apertures 24 and 26 of the mounting bracket 22. The resilient foam cushion 20 of the seat back 14 has a conventional seat cover 28 and an opening in the top thereof to permit entry of the support bar 32. An escutcheon 36 is provided and includes a laterally extending flange 38 which surrounds the support bar 32 and engages the cushion 20 to trim the opening in the seat back. The escutcheon 36 also includes a sleeve portion 42 having a central aperture 44 through which the support bar 32 is inserted.

Figure 3:
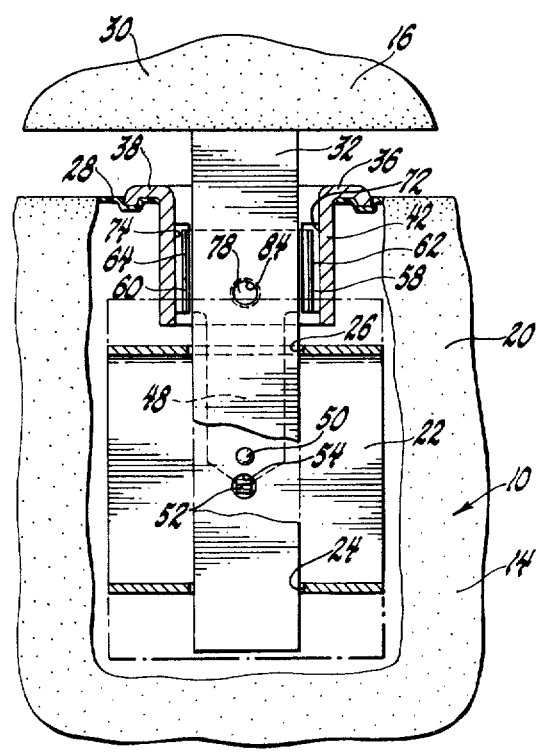
FIG. 3 is a sectional view taken the direction of arrows 3—3 of FIG. 2.
Figure 4:
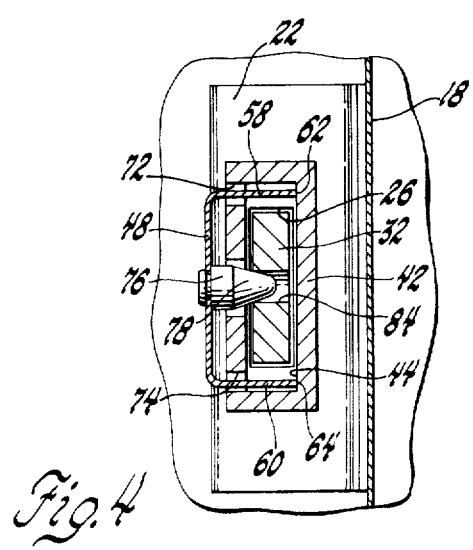
FIG. 4 is a sectional view taken the direction of arrows 4—4 of FIG. 2.

An improved latch arrangement for attaching the escutcheon and the support bar to the seat back 14 is provided as shown in FIGS. 2, 3 and 4. A leaf spring 48 has its lower end attached to the mounting bracket 22 by a rivet 50 and the insertion of tang 52 of the leaf spring 48 in an aperture 54 of the mounting bracket 22. The upper end of the leaf spring 48 has integral rearwardly bent latch members 58 and 60 which are beveled at their top edges to provide cam surfaces 62 and 64.

As best seen in FIG. 4 the latch members 58 and 60 are spaced laterally of each other by the width of the leaf spring 48. As seen in FIG. 2, the bottom of sleeve portion 42 of the escutcheon 36 has a cam surface 68 which coacts with the cam surfaces 62 and 64 of the latch members 58 and 60 to deflect the leaf spring 48 forwardly so that the escutcheon 36 may be inserted into the seat back. As best seen in FIG. 3, the sleeve portion 42 of the escutcheon 36 has a pair of apertures or slots 72 and 74 into which the latch members 58 and 60 are thrust by the biasing action of leaf spring 48 when the escutcheon 36 is fully inserted. As seen in FIGS. 2 and 3 the bottom surface of the latch members 58 and 60 engage the bottom walls of the apertures 72 and 74 so as to attach the escutcheon 36 to the seat back.

A latch pin 76 is mounted on the leaf spring 48 and has a tapered nose 78 which provides a cam surface which coacts with a cam surface 82 on the bottom end of the support bar 32. As the support bar 32 is inserted into the seat back, coaction of the cam surface 82 and the tapered nose 78 of the latch pin 76 is effective to deflect leaf spring 48 forwardly to carry the latch pin 76 out of the path of entry of the support bar 32, thereby permitting entry of the support bar 32. As best seen in FIGS. 3 and 4, the support bar 32 is of a width less than the lateral spacing between the latch members 58 and 60 so that entry of the support bar 32 does not result in engagement with the cam surfaces 62 or 64. The support bar has an aperture 84 in which the latch pin 76 is engaged by the rearward biasing action of the leaf spring 48 so as to attach the support bar 32 to the seat back.

It will be noted, as best seen in FIG. 2 that the leaf spring 48 is deflected in the forward direction through a greater arc upon coaction of the cam surfaces 62 and 64 with the escutcheon cam surface 68 than upon coaction of the tapered nose 78 of latch pin 76 with the cam surface 82 of the support bar 32. In this manner the latch members 58 and 60 are not withdrawn to the unlatched position relative to the slots 72 and 74 as the support bar 32 is inserted or removed.

The headrest is best installed in the following steps. The escutcheon 36 is slipped over the end of the support bar 32 and held up against the cushion 30. The lower end of the support bar 32 is then inserted into the seat back and into the apertures 24 and 26 of the mounting bracket 22 as the cam surface 82 engages the tapered nose 78 of the latch pin 76 to deflect the leaf spring 48 forwardly. Next, the escutcheon 36 is slipped down the support bar 32 into the opening of the seat back, thereby camming the leaf spring 48 further forward to allow the escutcheon to continue downward until the leaf spring moves rearwardly and engages the latch members 58 and 60 in the slots 72 and 74. The headrest 16 and its support bar 32 are then raised or lowered until the latch pin 76 is engaged within the aperture 84 of support bar 32 and the leaf spring 48 moves the latch members 58 and 60 fully rearward to complete their engagement in the slots 72 and 74 of escutcheon 36.

A special tool is provided to facilitate removal of the headrest from the seat back. The tool 86 includes a pair of legs 88 and 90 which are spaced apart so that they can straddle the support bar 32. The legs 88 and 90 have respective downwardly extending portions 92 and 94 which are so spaced and sized that they will enter the space between the edges of the support bar 32 and the sleeve portion 42 of the escutcheon 36. The ends of the leg portions 92 and 94 are engageable with the cam surfaces 62 and 64 of latch members 58 and 60 to bias the leaf spring 48 forwardly to thereby unlatch the latch members 58 and 60 from the escutcheon and unlatch the latch pin 76 from the retaining aperture 84 of the support bar 32.

Thus it is seen that an improved latch arrangement is provided for attaching a headrest and escutcheon to a vehicle seat.

What is claimed is:

1. In a vehicle seat including a seat back having an opening, a headrest cushion having a support bar, a mounting bracket within the seat back for slidably receiving the support bar, and an escutcheon for surrounding the support bar and trimming the opening in the seat back, the improvement comprising: spring biased means mounted on the seat back and having first and second latch members carried thereon, the first latch member and the escutcheon having coacting cam surfaces which are effective to deflect the spring biased means and carry the first latch member out of the path of entry of the escutcheon into the opening of the seat back, the escutcheon having an aperture therein into which the first latch member is engaged by the spring biased means to attach the escutcheon to the seat back, the second latch member and the support bar having coacting cam surfaces effective to deflect the spring biased means and carry the second latch member out of the path of entry of the support bar, and the support bar having an aperture therein into which the second latch member is engaged by the spring biased means to attach the support bar to the seat back.

2. In a vehicle seat including a seat back having an opening, a headrest cushion having a support bar, a mounting bracket within the seat back for slidably receiving the support bar, and an escutcheon for surrounding the support bar and trimming the opening in the seat back, the improvement comprising: spring biased means mounted on the seat back and having first and second latch members carried thereon, the first latch member and the escutcheon having coating cam surfaces which are effective to deflect the spring biased means and carry the first latch member out of the path of entry of the escutcheon into the opening of the seat back, the escutcheon having an aperture therein into which the first latch member is engaged by the spring biased means to attach the escutcheon to the seat back, the second latch member and the support bar having coacting cam surfaces effective to deflect the spring biased means and carry the second latch member out of the path of entry of the support bar, the support bar havng an aperture therein into which the second latch member is engaged by the spring biased means to attach the support bar to the seat back, and the interelationship between the respective latch members and cam surfaces being such as to maintain engagement of the first latch member in the aperture of the escutcheon when the spring biased means is deflected to the position in which the second latch member is not engaged in the aperture of the support bar.

3. In a vehicle seat including a seat back having an opening, a headrest cushion having a support bar, a mounting bracket within the seat back for slidably receiving the support bar, and an escutcheon for surrounding the support bar and trimming the opening in the seat back, the improvement comprising: a leaf spring mounted on the mounting bracket, a latch pin mounted on the leaf spring and extending into the path of entry of the support bar, a cam surface on the end of the support bar engaging the latch pin and deflecting the leaf spring to carry the latch pin out of the path of entry of the support bar, the leaf spring having a pair of latch members integral therewith and spaced laterally each side of the support bar, the upper end of the pair of latch members being inclined to provide cam surfaces located in the path of entry of the escutcheon into the seat back, the escutcheon engaging the cam surfaces to deflect the leaf spring and thereby carry the pair of latch members thereof out of the path of entry of the escutcheon, the escutcheon having slots therein aligned with the latch members and into which the latch members are biased by the leaf spring to latch the escutcheon on the seat back.

* * * * *